United States Patent Office 2,831,829
Patented Apr. 22, 1958

2,831,829

RUBBER COMPOUNDING AND VULCANIZATE THEREOF

Marvin C. Brooks, Middlebury, Conn., and Roswell H. Ewart, Bloomfield, N. J., assignors to United States Rubber Company, New York, N. Y., a corporation of New Jersey No Drawing. Application February 3, 1955
Serial No. 486,024

8 Claims. (Cl. 260—41.5)

This invention relates to improvements in the art of rubber compounding and more particularly to a method whereby improved filler-reinforced rubber vulcanizates are obtained by the addition thereto of certain organic silicon-containing materials.

The present invention is based upon our discovery that the reinforcing properties of silica and silicate fillers can be improved greatly by incorporating certain organo-organoxysilanes with the filler and the elastomer. The organo-organoxysilanes of the present invention are the reaction products of selected halogen-reactive organic oxygen compounds and organohalosilanes. We particularly prefer to use those reaction products which contain substantially no hydrolyzable halogen and are free-flowing liquids at ambient temperatures. Such organo-organoxysilanes are easily incorporated in the rubber-filler mixture and enable the preparation of filled stocks having greater flexibility, higher tensile and greater cut-growth resistance.

The organohalosilanes which may be used in the preparation of the organo-organoxysilanes of the present invention are selected from the group consisting of:

Saturated aliphatic hydrocarbon halosilanes
Saturated cycloaliphatic hydrocarbon halosilanes
Olefinically unsaturated aliphatic hydrocarbon halosilanes The halogen-reactive oxygen compounds which are reacted with organohalosilanes to form the reaction products used in our invention are selected from the group consisting of:

Saturated aliphatic monohydric alcohols
Saturated aliphatic dihydric alcohols (including both hydrocarbon diols and hydrocarbon ether-diols)
Oxiranes having the formula

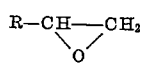

wherein R is hydrogen, methyl or ethyl.

The reaction between the halogen-reactive chemical and the organohalosilanes may be carried out in a variety of ways to produce the organo-organoxysilane reaction products operable in the process of the invention. Generally the preferable method of preparing the organo-organoxysilane will depend on the nature of the halogen-reactive material employed.

Thus, when dihydric alcohols are employed as the halogen-reactive component, the preferred method of making the reaction products is as described in U. S. Patent 2,680,124 to Brooks and in our copending United States patent application Serial Number 255,534, now Patent No. 2,715,135, which are expressly incorporated herein by reference. It is therein described how polymeric organo-organoxysilane reaction products which are liquids and free flowing at ambient temperatures, are prepared. Hydrogen halide is evolved during the course of the reactions; the products are substantially free of hydrolyzable halogen.

When monohydric alcohols are used as the halogen-reactive ingredient, products containing substantially no hydrolyzable halogen, are prepared by conventional procedures. The organo-organoxysilane products are monomeric, and of definite known structure. Examples of such reaction products are vinyltriethoxysilane, ethyltripropoxysilane, etc.

When oxiranes are employed as the hydrogen-reactive ingredient, they react directly with the organohalosilanes; the halogen in the silane couples to the beta carbon atom of the oxirane and an organo(chloro-organoxy)silane is formed as the reaction product. Hydrogen halide is not evolved in this reaction. Examples of such reaction products are propyltri-(2-chloroethoxy)silane, allyltri-(2-chloropropoxy)silane, etc.

All of the organo-organoxysilane reaction products of the present invention may also be prepared by ester interchange methods. The method involving the organohalosilanes, however, is preferred because it is more direct.

Specific examples of the alcohols and oxiranes which we prefer as the halogen-reactive constituent are as follows:

Ethylene glycol
Propylene glycol
Diethylene glycol
Ethyl alcohol
n-propyl alcohol
n-butyl alcohol
Ethylene oxide
Propylene oxide (1,2)

It will be seen that the preferred halogen-reactive oxygen compounds are the hydrocarbon diols, hydrocarbon ether-diols, $C_2$ to $C_4$ alkanols, and oxiranes containing not more than three carbon atoms per molecule.

Specific examples of organohalosilanes which can be used in preparing the organo-organoxysilanes are as follows:

Ethyltrichlorosilane
Amyltrichlorosilane
Nonyltrichlorosilane
Hexadecyltrichlorosilane
Cyclohexyltrichlorosilane
Vinyltrichlorosilane
Allyltrichlorosilane
Diethyldichlorosilane
Divinyldichlorosilane The reaction between the organohalosilane and the halogen-reactive oxygen compound can be effected by merely commingling the two reactants under such conditions that they react with the formation of the desired organo-organoxysilane. In the case of an alcohol, the reaction is accompanied by the liberation of hydrogen halide in amount corresponding to the amount of halogen in the organohalosilane, the hydrogen of the hydrogen halide coming from the alcoholic hydroxyl groups. Provision should be made for removal of the gaseous hydrogen halide as formed, in ways well-known to those skilled in the art. Alternatively, we can effect the reaction in the presence of a suitable hydrogen halide acceptor or binder, usually an alkaline-reacting material, e. g., an alkaline earth carbonate, which neutralizes the hydrogen halide immediately upon its formation, thereby forcing the reaction toward completion. Typically, we use a reactor provided with stirring means, means for heating, means for refluxing, and a trap for removing the hydrogen halide gas. To this reactor we charge the alcohol and then gradually add the organohalosilane, with stirring. The reaction proceeds spontaneously with evolution of heat and hydrogen halide. After addition of the organohalosilane is complete we heat the reaction mixture to an elevated temperature (e. g. 200° C.) to accelerate the reaction and carry it to completion. The reaction mixture when withdrawn is then ready for use. Care should be taken, of course, to remove all traces of free hydrogen halide from the reaction mixture before use thereof, in order to give a product free from corrosive tendencies. The reaction is carried out at an elevated temperature which can range from 50° to 250° C. but commonly ranges from 150° to 225° C. Since the alcohol and the organohalosilane interact exothermically, a considerable portion of the reaction occurs during the period of intermixing.

The following is a typical method of reacting a dihydric alcohol with an organohalosilane to make products which can be used in accordance with our invention. The reaction is carried out in a three-necked flask, provision being made for stirring, refluxing, and the dropwise addition of the silane. A trap is provided to remove the hydrogen chloride formed during the reaction. To 159 g. of diethylene glycol, 202.5 g. of dodecyltrichlorosilane is added dropwise, with continuous stirring of the mixture. The reaction is accompanied by the evolution of heat and hydrogen chloride. After the addition of the silane has been completed, the reaction mixture is heated gradually up to 200° C. During this period further hydrogen chloride is driven off. The product is a slightly discolored liquid. Analysis shows it to contain only 0.72% of residual chlorine, indicating that the reaction has gone substantially to completion.

When a dihydric alcohol is used, we employ such relative proportions of alcohol and silane as to furnish an excess of hydroxyl groups present in the alcohol over chlorine atoms in the silane, so that the product will be a free flowing liquid rather than an isoluble gel. The ratio of equivalents of hydroxyl (from dihydric alcohol) to chlorine (from organotrihalosilane) should be greater than 1.3 to 1.0 and not greater than 2.0 to 1.0. The ratio of equivalents of hydroxyl (from dihydric alcohol) to chlorine (from organodichlorosilane) should be greater than 1.0 to 1.0 and not greater than 2.0 to 1.0. We generally use quantities of reactants in the ratio of about 1.5 hydroxyl to 1.0 chlorine.

When a monohydric alcohol is used we likewise prefer to employ an excess over theoretical in order to insure that the product be substantially free of residual chlorine.

When an oxirane is used, the same procedure as is described above for the alcohols can be followed except that there is no need to provide for removal of hydrogen chloride because the reaction liberates no hydrogen halide. When an oxirane is used, the reactants are simply brought together, the silane preferably being added gradually to the oxirane, after which the reaction mixture can be heated to an elevated temperature of the order indicated above to effect completion of the reaction. The theoretical proportions can be employed but we prefer to employ a slight excess of the oxirane over the organohalosilane in order to insure that the reaction product be substantially free of residual chlorine.

We believe that when one of the organo-organoxysilanes of the present invention is incorporated with the elastomer and siliceous filler in accordance with our invention a reaction between the filler and the chemical takes place whereby a chemical linkage with the surface of the filler is brought about. It is believed that this reaction between the chemical and the filler involves the liberation of an alcohol or chlorohydrin (depending on whether an alcohol or an oxirane was used as the reactant in preparing the organo-organoxysilane) corresponding to the organoxy group in the organo-organoxysilane and that the reaction simultaneously effects chemical combination of the residue of the organo-organoxysilane with the surface of the filler and that the latter effect is responsible for the enhanced reinforcing properties conferred on the filler.

When a glycol was used as the reactant in making the organo-organoxysilane, this glycol is liberated by the reaction between the chemical and the filler. When a monohydric alcohol was used, we believe that it is evolved in the reaction with the filler. When an oxirane was used, since no hydrogen halide was evolved in making the reaction product, we believe that the corresponding alkylene chlorohydrin is evolved during the reaction with the filler. Thus with ethylene oxide it is thought that ethylene chlorohydrin is liberated.

The convenience of our method of treating silica or silicate fillers will be evident to those skilled in the art. Our method involves little additional material handling and is economical. Incorporation of the organo-organoxysilane reaction products is especially convenient because of their low volatility and their liquid form which enable them to be added by ordinary rubber compounding techniques using conventional rubber compounding equipment.

In practicing our invention we find it highly desirable to intermix the elastomer, the siliceous filler, and the organo-organoxysilane intimately at an elevated temperature before incorporating the zinc oxide commonly used to promote vulcanization.

The evidence indicates that zinc oxide reacts rapidly with the organo-organoxysilane used in the practice of our invention and that this side reaction interferes with the desired reaction, viz., that of the organo-organoxysilane with the surface of the siliceous filler. If the zinc oxide is incorporated prior to mixing of the organo-organoxysilane and the filler with the elastomer, the resulting vulcanized product has a much lower modulus than the vulcanized product obtained when the preferred order of incorporating the compounding ingredients, viz., delaying the addition of the zinc oxide until after the organo-organoxysilane has been intimately mixed at an elevated temperature, is used; other physical properties are affected adversely also.

Our invention is applicable with any of the conventional high-unsaturation sulfur-vulcanizable elastomers. By "high-unsaturation" we mean containing at least 25% by weight, and usually a major proportion of combined aliphatic conjugated diolefin hydrocarbon, almost invariably butadiene or isoprene. Our invention can be applied to natural rubber, e. g., Hevea, but it is particularly applicable to those synthetic elastomers which are commonly considered to be equivalents of natural rubber, such as synthetic homopolymers of aliphatic conjugated diolefin hydrocarbons and synthetic copolymers of such diolefin hydrocarbons with other copolymerizable materials, which copolymers contain at least 25% of combined diolefin. Examples of such copolymers are rubbery butadiene styrene copolymers, rubbery butadiene-acrylonitrile copolymers and rubbery copolymers of butadiene and an alkyl acrylate.

The amount of organo-organoxysilane employed can vary within wide limits. Typically, we employ 1 to 6% by weight of the organo-organoxysilane based on the weight of the filler used. Such amounts of the silanes suffice to effect treatment of the surface of the filler and to produce the improved results of the invention. We can use even greater amounts of the organo-organoxysilane, ranging as high as 10% of the weight of the filler.

A wide variety of fillers can be employed in the practice of our invention. We may employ precipitated hydrated silicas of very fine particle size such as the material known commercially as "Hi-Sil" which has a particle size of about 200 Angstrom units and a surface area of 150 square meters per gram, and contains 10.7% of water of hydration, corresponding to 0.073 gram of water per 100 square meters of surface area. Another form of hydrated silica of the same general type is one obtained by precipitation from an aqueous colloidal dispersion of silica known commercially as "Ludox," the silica derived therefrom having a particle size of about 250 Angstrom units and a surface area of 125 square meters per gram and containing 5.6% of water of hydration, corresponding to 0.046 gram of water per 100 square meters of surface area.

We have obtained satisfactory results with a precipitated hydrated calcium silicate having a particle size of about 300 Angstrom units and sold commercially as "Silene EF," which contains about 13 to 19% of water of hydration, as determined by ashing. Another filler which we have successfully used is kaolin such as that known commercially as "Suprex" clay which has plate-like particles of a wide distribution of sizes averaging approximately 5,000 Angstrom units and containing 14% of water of hydration.

In the practice of our invention we can use any silica, calcium silicate or kaolin having the particle size and water of hydration specified hereinafter. One of the most important features of our invention is that it enables the use of kaolin in applications where heretofore more highly reinforcing and more costly fillers were necessary. This is especially advantageous because of the low cost of kaolin.

It is important to note that the fillers should not be dried at a materially elevated temperature before incorporation with the rubber and the organo-organoxysilane. We have found that drying of the filler impairs its response to treatment with the chemical and its ability to give an improved vulcanizate. We believe that this is due to the fact that drying, by which we mean heating at an elevated temperature under such conditions as to remove appreciable amounts of water from the filler, reduces the ability of the filler to respond to the treatment of the invention by reducing the amount of water of hydration contained therein. We believe that the water of hydration manifested on the surfaces of the filler particles is essential to the operability of the invention. We believe that the chemical combination of the residue of the organo-organoxysilane with the filler is responsible for the improvement in physical properties of the vulcanizates.

In the practice of our invention, we employ fillers which can be defined as being composed of silica, calcium silicate or kaolin having an average particle size not greater than 10 microns and a degree of hydration not less than that represented by 0.02 gram of moisture per 100 square meters of surface area. According to calculations based upon the assumption that the packing of water on a surface is equal to that in liquid water, a mono-molecular surface film of water would weigh about 0.03 gram per 100 square meters of surface area.

Whether the so-called "water of hydration" is chemically bound to or physically held by the filler is of theoretical interest only. Regardless of the exact manner in which the water is bound, it is so tightly held that the beneficial effects of treatment of the filler with the organo-organoxysilane are obtained. Actually, part of the water may be chemically bound while the rest is physically held. We measure the amount of water of hydration by determining loss of weight upon ignition and assume that the figure thus obtained represents the amount of water available.

As indicated above, we prefer to mix the elastomer, filler and organo-organoxysilane at elevated temperatures in order to effect maximum reaction between the chemical and the filler. A convenient method of effecting the reaction is to use an internal mixer in which temperatures of approximately 250°–400° F. are developed. Temperatures in this range are quite adequate to cause our reaction to go substantially to completion within a few minutes. In the laboratory where it is a common practice to use open mills for combining rubber and filler we have found it sufficient to mill the rubber and filler and the chemical for 10 minutes at 300° F., thus approximating factory conditions.

The following examples will illustrate the invention more fully. The data on physical properties reported in these examples were obtained at room temperature unless otherwise noted. Stress-strain properties were measured by conventional ASTM methods. The stress at 300% elongation has been taken as a measure of modulus. Set was determined at break after 30 seconds, rather than after 10 minutes as recommended by ASTM. Hysteresis results were determined at 280° F. on a torsional hysterometer (see M. Mooney and R. H. Gerke, India Rubber World, 103, 29 (1941)). In determining flex life, dumbbell-shaped specimens were oscillated at 300 cycles per minute to 100% elongation. Values given are kilocycles required to break the test piece. Durometer hardness was measured as Shore A Durometer after 5 seconds.

EXAMPLE 1

Organo-organoxysilanes prepared by reacting diethylene glycol with various saturated organochlorosilanes in the manner described above were incorporated in GR–S stocks containing "Hi-Sil" silica as the filler. The formulation was as follows:

| | Parts by weight |
|---|---|
| GR–S | 100 |
| Coumarone resin (softener) | 10 |
| "Hi-Sil" silica | 54 |
| Diethylene glycol and saturated organochlorosilane reaction product | 4 |
| Zinc oxide | 5 |
| Accelerators | 1.2 |
| Sulfur | 3 |

In a control in which no organo-organoxysilane was employed, we used three parts of diethylene glycol in place thereof.

The methods of mixing involved blending the GR–S, the coumarone resin, the "Hi-Sil" silica and the organo-organoxysilane, or the diethylene glycol, on a cold mill and then milling for 10 minutes at 300° F. The remaining ingredients were then added on a cold mill. This hot-milling was necessary to get optimum efficiency from the organo-organoxysilane additives. The temperature used corresponds to that generally used in large internal rubber mixers such as those of the Banbury type. The stocks were cured for 45 minutes at 292° F. The cured stocks were tested as indicated in the following Table I:

*Table I*

| Organo-organoxysilane: Reaction product of diethylene glycol and— | (Shore A) Durometer | Torsional Hysteresis at 280° F. | Tensile | Elongation at Break | Modulus (Stress at 300% Elongation) |
|---|---|---|---|---|---|
| No reaction product (control, used 3 pts. diethylene glycol) | 60 | .184 | 1,810 | 470 | 990 |
| Diethyldichlorosilane | 52 | .141 | 1,880 | 530 | 785 |
| Amyltrichlorosilane | 55 | .108 | 2,020 | 510 | 960 |
| Nonyltrichlorosilane | 55 | .103 | 1,890 | 490 | 875 |
| Dodecyltrichlorosilane | 55 | .097 | 1,890 | 510 | 860 |
| Cyclohexyltrichlorosilane | 56 | .136 | 1,930 | 490 | 925 |

It will be seen that all of the organo-organoxysilanes gave a marked lowering in the torsional hysteresis of the stocks. The organo-organoxysilanes also gave lower hardness. They did not adversely affect the other physical properties.

In order to show the desirability of the hot-milling, we conducted two experiments which were similar to those just reported, except that we used only cold milling, omitting the hot milling step. In the control we used three parts of diethylene glycol and in the other experiment we used four parts of the organo-organoxysilane formed by reacting diethylene glycol with nonyltrichlorosilane. The results are given in Table Ia.

*Table Ia (Cold milling only)*

| Silane Reacted with Diethylene Glycol | Durometer (Shore A) | Torsional Hysteresis at 280° F. | Tensile | Elongation at Break | Stress at 300% |
|---|---|---|---|---|---|
| None (Control) | 67 | .268 | 2,000 | 480 | 950 |
| Nonyltrichlorosilane | 55 | .159 | 2,040 | 580 | 740 |

From a comparison of Tables I and Ia it is readily evident that the torsional hysteresis is lower when hot milling is employed.

EXAMPLE 2

The effect of varying the amount of the organo-organoxysilane, formed by reacting diethylene glycol with diethyldichlorosilane, added to a GR–S stock filled with "Hi-Sil" silica was determined. The formulation was as follows:

|  | Parts by weight |
|---|---|
| GR–S | 100 |
| Coumarone resin | 10 |
| "Hi-Sil" silica | 54 |
| Diethylene glycol | [1] 3,2,1,0 |
| Diethyldichlorosilane-diethylene glycol reaction product | As indicated |
| Zinc oxide | 5 |
| Accelerators | 1.2 |
| Sulfur | 3 |

[1] With 0,2,4,6, parts of the diethyldichlorosilane-diethylene glycol reaction product, respectively.

The GR–S, coumarone resin, "Hi-Sil" silica, diethylene glycol, and the diethyldichlorosilane-diethylene glycol reaction product were blended in an internal mixer. The total mixing time was 12 minutes; during the last 9 minutes, the mixing temperature was maintained at 300° F. The remaining ingredients were incorporated on a cold mill. The stocks were cured 40 minutes at 292° F. The data were as follows:

| Parts reaction product of diethyldichlorosilane and diethylene glycol | Durometer | Tensile | Elongation | Set at Break | Stress at 300% | Tors. Hyst. at 280° F. |
|---|---|---|---|---|---|---|
| 0 | 66 | 2,010 | 520 | 20 | 850 | .207 |
| 2 | 60 | 1,860 | 500 | 17 | 765 | .151 |
| 4 | 58 | 1,900 | 520 | 17 | 735 | .139 |
| 6 | 57 | 1,640 | 520 | 16 | 665 | .116 |

It is evident that substantial lowering of torsional hysteresis and Durometer hardness was effected by using two parts of the diethyldichlorosilane-diethylene glycol reaction product, and that further improvements in these properties were obtained, by using amounts greater than two parts.

Examples 1 and 2 show specifically how the reaction products of saturated aliphatic hydrocarbon halosilanes and diethylene glycol, and the reaction products of saturated cycloaliphatic hydrocarbon halosilanes and diethylene glycol, cause a marked reduction of the hysteresis of GR–S stocks containing "Hi-Sil" silica. Similarly, organo-organoxysilanes prepared from saturated aliphatic hydrocarbon halosilanes or saturated cycloaliphatic hydrocarbon halosilanes and halogen-reactive materials other than diethylene glycol, and selected from the group consisting of saturated aliphatic monohydric alcohols, saturated aliphatic dihydric alcohols, and oxiranes, cause the same improvements in hysteresis as those demonstrated in Examples 1 and 2. Although "Hi-Sil" silica was used in Examples 1 and 2, other fine-particle hydrated silicas and silicates, such as the commercial materials precipitated "Ludox" and "Silene EF," can be used also. The reaction products of saturated aliphatic hydrocarbon halosilanes or saturated cycloaliphatic hydrocarbon halosilanes and the appropriate halogen-reactive materials are most effective in improving the hysteresis of stocks containing the fine-particle siliceous fillers, such as those having particle diameters of 0.1 micron or less.

Improvements in stocks filled with siliceous fillers can also be obtained by the use of olefinically unsaturated aliphatic hydrocarbon organoxysilanes. These silanes impart an increase in modulus, an increase in tensile strength, particularly at high temperatures, an increase in flex life, a decrease in permanent set, and a decrease in hysteresis. These improvements are imparted to stocks containing either fine-particle siliceous fillers such as "Hi-Sil" silica or the siliceous fillers of larger particle size such as kaolin. These improvements are demonstrated in Examples 3–7.

Examples 3 and 4 show the effects of using several different olefinically unsaturated hydrocarbon organoxysilanes, according to the methods of this invention, to improve the properties of GR–S stocks filled with kaolin.

EXAMPLE 3

The vinylorganoxysilanes formed by reacting vinyltrichlorosilane with several different halogen-reactive materials were incorporated in GR–S stocks containing kaolin. The formulation was as follows:

|  | Parts by weight |
|---|---|
| GR–S | 100 |
| Coumarone resin | 10 |
| "Suprex" clay | 72 |
| Vinylorganoxysilane | 3 |
| Zinc oxide | 3 |
| Accelerators | 2 |
| Sulfur | 2.5 |

The stocks were mixed by blending the GR–S, coumarone resin, clay and vinylorganoxysilane on a cold mill, then milling the blended mixture for 10 minutes at 300° F., after which the other ingredients were blended on a warm mill. The stocks were cured for 45 minutes at 292° F. The data were as follows:

*Table III*

| Vinylorganoxysilane Added to GR–S Compound | Tensile | Elongation | Stress at 300% | 212° F. Tensile | 280° F. Tors. Hyst. |
|---|---|---|---|---|---|
| None | 1,425 | 400 | 1,125 | 370 | .083 |
| Reaction product of vinyltrichlorosilane and diethylene glycol | 1,800 | 360 | 1,525 | 565 | .061 |
| Vinyltriethoxysilane | 1,680 | 340 | 1,575 | 640 | .051 |
| Vinyltri-n-propoxysilane | 1,775 | 380 | 1,550 | 645 | .056 |
| Vinyltris-(2-chloroethoxy) silane | 1,760 | 360 | 1,590 | 655 | .050 |
| Vinyltris-(2-chloropropoxy)-silane | 1,625 | 320 | 1,550 | 600 | .050 |

The improvements in the properties of the stocks are evident.

EXAMPLE 4

Allyltriethoxysilane was incorporated into a GR–S stock containing kaolin. The formulation was similar to that of Example 3, except for the substitution of varying amounts of allyltriethoxysilane for the vinylalkoxysilanes of Example 3. The data were as follows:

*Table IV*

| Allyltriethoxysilane added to GR–S Compound | Tensile | Elong. | Percent Set at Break | Stress at 300% | Tensile at 212° F. | Tors. Hyst. at 280° F. |
|---|---|---|---|---|---|---|
| None | 1,610 | 550 | 40 | 800 | 405 | .162 |
| 1.0 part | 1,850 | 450 | 22 | 1,350 | 805 | .065 |
| 2.0 parts | 1,800 | 370 | 13 | 1,510 | 815 | .056 |

The improvements brought about by the use of 1 and 2 parts of allyltriethoxysilane are evident.

Example 5 shows the effect of the addition of a vinyl alkoxysilane to GR–S stocks containing several different siliceous fillers.

EXAMPLE 5

The vinylalkoxysilane formed by the reaction of vinyltrichlorosilane and diethylene glycol in the manner described above was incorporated in GR-S stocks containing three different siliceous fillers, namely, "Hi-Sil" silica, "Silene EF" precipitated calcium silicate, and "Suprex" clay. The formulation was as follows:

| | Parts by weight |
|---|---|
| GR-S | 100 |
| Coumarone resin | 10 |
| Siliceous filler | As indicated |
| Reaction product of vinyltrichlorosilane and diethylene glycol | 3 |
| Zinc oxide | 5 |
| Accelerators | 2 |
| Sulfur | 3 |

Mixing and curing were carried out as in Example 3. The "control" stocks were similar to the stocks containing the vinylalkoxysilane reaction product except that in the "control" stocks the silane was replaced with 3 parts of diethylene glycol. The weights of the fillers were chosen so that there would be equivalent volume loadings of the three fillers. The data were as follows:

Table V

| Filler | Tensile | Elong. | Set at Break | Stress at 300% | 212° F. Tensile | Tors. Hyst. at 280° F. | Flex Life |
|---|---|---|---|---|---|---|---|
| 54 "Hi-Sil" with reaction product | 2,910 | 610 | 25 | 1,150 | 1,110 | .192 | 314 |
| 54 "Hi-Sil" control | 2,490 | 630 | 28 | 875 | 895 | .268 | 163 |
| 58 "Silene EF" with reaction product | 2,010 | 570 | 16 | 1,040 | 770 | .080 | 147 |
| 58 "Silene EF" control | 2,080 | 610 | 24 | 850 | 650 | .095 | 63 |
| 72 "Suprex" clay with reaction product | 1,610 | 440 | 21 | 1,350 | 775 | .074 | 110 |
| 72 "Suprex" clay control | 1,740 | 570 | 35 | 915 | 475 | .103 | 107 |

The improvements in the properties brought about by the use of the vinyltrichlorosilane-diethylene glycol reaction products are evident.

Following are further examples of the effect of the addition of olefinically unsaturated hydrocarbon alkoxysilanes to GR-S stocks containing "Hi-Sil" silica.

EXAMPLE 6

The vinylalkoxysilane reaction products formed by reaction of vinyltrichlorosilane with three different glycols, namely diethylene glycol, ethylene glycol and propylene glycol, were incorporated in GR-S stocks containing "Hi-Sil" silica. The formulation was as follows:

| | Parts by weight |
|---|---|
| GR-S | 100 |
| Coumarone resin | 10 |
| "Hi-Sil" silica | 54 |
| Vinyltrichlorosilane-glycol reaction product | 3 |
| Zinc oxide | 5 |
| Accelerators | 2 |
| Sulfur | 3 |

The stocks were mixed and cured as in Example 3. The data were as follows:

Table VI

| Vinyltrichlorosilane reacted with— | Tensile | Elong. | Set at Break | 212° F. Tensile | Stress at 300% | Tors. Hyst. at 280° F. | Flex Life |
|---|---|---|---|---|---|---|---|
| Diethylene glycol | 2,910 | 610 | 31 | 1,110 | 1,150 | .192 | 314 |
| Ethylene glycol | 2,600 | 610 | 31 | 1,130 | 1,020 | .176 | |
| Propylene glycol | 2,610 | 590 | 30 | 1,250 | 1,125 | .187 | 292 |
| Control (no silane) with 3 pts. diethylene glycol | 2,490 | 630 | 36 | 895 | 875 | .268 | 163 |

It will be seen that all of the organo-organoxysilanes tested gave a marked increase in tensile strength, especially tensile at 212° F., a marked improvement in modulus, a considerable decrease in torsional hysteresis and a substantial reduction in set at break. Flex life was very materially increased in the two cases reported.

EXAMPLE 7

Allyltri-2-(chloroethoxy)silane, which is prepared by reacting allyltrichlorosilane with ethylene oxide, was added to a GR-S compound containing "Hi-Sil" silica. The formulation was as follows:

| | Parts by weight |
|---|---|
| GR-S | 100 |
| Coumarone resin | 10 |
| "Hi-Sil" silica | 54 |
| Allyltri-2-(chloroethoxy)silane | As indicated |
| Stearic acid | 1 |
| Zinc oxide | 3 |
| Accelerators | 2 |
| Sulfur | 2.5 |

The stocks were mixed and cured as in Example 3. The data were as follows:

Table VIII

| Silane added to GR-S Compound | Tensile | Elong. | Percent Set at Break | Stress at 300% | Durometer | 212° F. Tensile | 280° F. Tors. Hyst. |
|---|---|---|---|---|---|---|---|
| None | 1,800 | 650 | 27 | 625 | 60 | 875 | .218 |
| 1.5 parts | 2,330 | 560 | 20 | 1,020 | 62 | 925 | .152 |
| 3.0 parts | 2,200 | 490 | 12 | 1,280 | 65 | 1,020 | .134 |
| 6.0 parts | 2,100 | 350 | 08 | 1,650 | 65 | | .103 |

The improvements in the stocks brought about by the use of increasing amounts of allyltri-2-(chloroethoxy)silane are evident.

To recapitulate, the organo-organoxysilanes formed by reacting saturated aliphatic (and cycloaliphatic) hydrocarbon halosilanes with the halogen-reactive materials described in this invention effect a marked reduction in the stiffening action of precipitated hydrated silica or calcium silicate fillers of very fine particle size (less than 0.1 micron) in the high-unsaturation elastomers, thereby overcoming the objectionable stiffness of vulcanizates containing such fillers. These silanes give a considerable improvement in flexibility manifested by a considerably lower torsional hysteresis and hardness.

The incorporation of organo-organoxysilanes in stocks containing fillers of such fine particle size makes it possible to use GR–S stocks in many applications where flexible, low-modulus natural rubber stocks are now used but for which GR–S has not heretofore been considered usable. Footwear and specialty applications, such as bathing caps, are examples. Heretofore it has been difficult to provide a GR–S stock having satisfactory tensile strength and at the same time low modulus and good flexibility. The dilemma has been that fillers such as carbon black, which are reinforcing with respect to tensile, are also reinforcing with respect to modulus. The incorporation of the saturated hydrocarbon organoxysilanes in GR–S stocks containing the fine-particle siliceous fillers enables the simultaneous attainment of good tensile and low modulus.

Further applications of this invention result from the use of the olefinically unsaturated aliphatic hydrocarbon organoxysilanes. These silanes impart to vulcanizates of high-unsaturation elastomers containing hydrated siliceous fillers very important improvements in physical properties. Specifically, they impart improvements in tensile strength, particularly, hot tensile strength, increase in modulus, increase in flex life, reduction in permanent set, and reduction in hysteresis.

Carbon black has heretofore been considered the outstanding reinforcing filler. The present invention effects such improvement in the reinforcing properties of the silica, calcium silicate and kaolin fillers as to cause them to approach and in some respects surpass carbon blacks of comparable particle size. Thus the present invention permits the substitution of silica, calcium silicate and kaolin fillers in many applications where carbon black has been required heretofore. The invention can be used in the manufacture of rubber footwear, belting, wire, insulation, tires and miscellaneous molded rubber goods. A highly desirable feature of the use of the silica, calcium silicate and kaolin fillers is that they enable the rubber manufacturer to produce high quality products over the whole color range without restriction as to color. Another advantage is that the electrical resistance of stocks filled with these fillers is much higher than that of stocks filled with carbon black. Consequently, where good electrical insulating characteristics are required, the use of silica, calcium silicate and kaolin fillers in accordance with the invention will be preferable to the use of carbon black.

From the foregoing description, many advantages of our invention will be apparent to those skilled in the art. The principal advantage is that the invention provides a simple, economical and highly advantageous method of treatment of silica, calcium silicate and kaolin fillers to improve their reinforcing characteristics. Another advantage is that the treatment of the invention is accomplished without introducing any objectionable complication into the rubber compounding technique. Many other advantages of the invention will be apparent to those skilled in the art.

This application is a continuation-in-part of our co-pending application, Serial No. 250,788, filed October 10, 1951, and allowed October 27, 1954.

Having thus described our invention, what we claim and desire to protect by Letters Patent is:

1. The method which comprises commingling (A) a halogen-free, liquid reaction product of a hydrocarbon halosilane and an excess of an aliphatic oxygen compound, (B) a sulfur-vulcanizable elastomer containing at least 25% of combined aliphatic conjugated diolefin, and (C) a filler selected from the group consisting of precipitated hydrated silica, precipitated hydrated calcium silicate and kaolin, said filler having an average particle size not greater than 10 microns and a degree of hydration corresponding to not less than 0.02 gram of moisture per 100 square meters of surface area, and heating the mixture to at least 250° F. to effect reaction of said reaction product with said filler to form a chemical linkage with the surface of said filler, said halosilane being selected from the group consisting of aliphatic and cycloaliphatic saturated hydrocarbon halosilanes, and olefinically unsaturated hydrocarbon halosilanes, and said oxygen compound being selected from the group consisting of saturated aliphatic monohydric and dihydric alcohols, and oxiranes having the formula

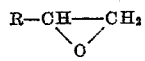

wherein R is selected from the group consisting of hydrogen, methyl, and ethyl, said reaction product being employed in amount of from 1% to 10% of the weight of said filler.

2. A sulfur vulcanizate of the product of claim 1.

3. The method which comprises commingling (A) the halogen-free, liquid reaction product of a hydrocarbon halosilane and an excess of an aliphatic oxygen compound, (B) a sulfur-vulcanizable elastomer containing at least 25% of combined aliphatic conjugated diolefin, and (C) a filler selected from the group consisting of precipitated hydrated silica, precipitated hydrated calcium silicate and kaolin, said filler having an average particle size not greater than 10 microns and a degree of hydration corresponding to not less than 0.02 gram of moisture per 100 square meters of surface area, heating the mixture to at least 250° F. to effect reaction of said reaction product with said filler to form a chemical linkage with the surface of said filler, thereafter admixing other compounding ingredients including zinc oxide and sulfur, and vulcanizing the resulting mixture, said halosilane being selected from the group consisting of aliphatic and cycloaliphatic saturated hydrocarbon halosilanes, and olefinically unsaturated hydrocarbon halosilanes, and said oxygen compound being selected from the group consisting of saturated aliphatic monohydric and dihydric alcohols, and oxiranes having the formula

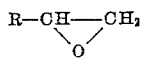

where R is selected from the group consisting of hydrogen, methyl, and ethyl, said reaction product being employed in amount of from 1% to 10% of the weight of said filler.

4. The method which comprises commingling (A) a halogen-free, liquid reaction product of a hydrocarbon halosilane and an excess of an aliphatic dihydric alcohol with (B) a sulfur-vulcanizable elastomer of relatively high unsaturation and containing a major proportion of aliphatic conjugated diolefin, and (C) a filler selected from the group consisting of silica, calcium silicate, and kaolin, said filler having an average particle size not greater than 10 microns and a degree of hydration corresponding to not less than 0.02 gram of moisture per 100 square meters of surface area, and heating the mixture to at least 250° F. to effect reaction of said reaction product with said filler to form a chemical linkage with the surface of said filler and release said aliphatic dihydric alcohol, said halosilane being selected from the group consisting of aliphatic and cycloaliphatic saturated hydrocarbon halosilanes, and olefinically unsaturated hydrocarbon halosilanes, said reaction product being employed in amount of from 1% to 10% of the weight of said filler.

5. A method as in claim 4 in which the said filler is precipitated hydrated silica.

6. A method as in claim 4 in which the said filler is precipitated hydrated calcium silicate.

7. A method as in claim 4 in which the said filler is kaolin.

8. The method which comprises commingling (A) a halogen-free, liquid reaction product of a hydrocarbon halosilane and an excess of an aliphatic dihydric alcohol with (B) a sulfur-vulcanizable elastomer of relatively high unsaturation and containing a major proportion of aliphatic conjugated diolefin, and (C) a filler selected from the group consisting of precipitated hydrated silica, precipitated hydrated calcium silicate, and kaolin, said filler having an average particle size not greater than 10 microns and a degree of hydration corresponding to not less than 0.02 gram of moisture per 100 square meters of surface area, heating the mixture to at least 250° F. to effect reaction of said reaction product with said filler to form a chemical linkage with the surface of said filler and release said aliphatic dihydric alcohol, said halosilane being selected from the group consisting of aliphatic and cycloaliphatic saturated hydrocarbon halosilanes, and olefinically unsaturated hydrocarbon halosilanes, thereafter admixing other compounding ingredients including zinc oxide and sulfur, and vulcanizing the resulting mixture, said reaction product being employed in amount of from 1% to 10% of the weight of said filler.

No references cited.